United States Patent
Teglia

(10) Patent No.: US 8,688,995 B2
(45) Date of Patent: *Apr. 1, 2014

(54) METHOD AND APPARATUS FOR DETECTION OF A FAULT ATTACK

(75) Inventor: Yannick Teglia, Belcodene (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 521 days.

This patent is subject to a terminal disclaimer.

(21) Appl. No.: 12/943,478

(22) Filed: Nov. 10, 2010

(65) Prior Publication Data

US 2011/0119762 A1 May 19, 2011

(30) Foreign Application Priority Data

Nov. 18, 2009 (FR) ..................... 09 58141

(51) Int. Cl.
*H04L 9/00* (2006.01)
(52) U.S. Cl.
USPC ........... 713/176; 713/177; 713/178; 713/179; 726/23; 726/24; 726/25; 726/26
(58) Field of Classification Search
USPC .................. 380/2; 726/23; 713/176
See application file for complete search history.

(56) References Cited

U.S. PATENT DOCUMENTS

| | | | | |
|---|---|---|---|---|
| 7,111,126 | B2 * | 9/2006 | Biles et al. | 711/137 |
| 7,848,515 | B2 * | 12/2010 | Dupaquis et al. | 380/28 |
| 7,856,523 | B2 * | 12/2010 | Bittner, Jr. | 711/108 |
| 2005/0157871 | A1 * | 7/2005 | Komano et al. | 380/28 |
| 2006/0045264 | A1 * | 3/2006 | Kocher et al. | 380/37 |
| 2006/0212770 | A1 * | 9/2006 | Fischer et al. | 714/742 |
| 2007/0019805 | A1 * | 1/2007 | Karpovsky et al. | 380/28 |
| 2007/0177720 | A1 * | 8/2007 | Bevan et al. | 380/28 |
| 2007/0188355 | A1 * | 8/2007 | Baek | 341/51 |
| 2007/0286413 | A1 * | 12/2007 | Derouet | 380/28 |
| 2009/0323956 | A1 * | 12/2009 | Tsunoo et al. | 380/268 |
| 2011/0119532 | A1 * | 5/2011 | Teglia | 714/45 |

FOREIGN PATENT DOCUMENTS

FR 2841015 A1 12/2003

OTHER PUBLICATIONS

French Search Report dated Jun. 16, 2010 from corresponding French Application No. 09/58141.
French Search Report dated Jun. 16, 2010 from related French Application No. 09/58142.
French Search Report dated Jun. 16, 2010 from related French Application No. 09/58140.

(Continued)

*Primary Examiner* — Longbit Chai
(74) *Attorney, Agent, or Firm* — Wolf, Greenfield & Sacks, P.C.

(57) ABSTRACT

The invention concerns a method of detecting a fault attack including providing a plurality of blinding values; generating a first set of data elements including a first group of data elements and at least one additional data element generated by performing the exclusive OR between at least one data element in the first group and at least one of the blinding values; generating a second set of data elements corresponding to the exclusive OR between each data element of the first set and a selected one of the plurality of blinding values; generating a first signature by performing a commutative operation between each of the data elements of the first set; generating a second signature by performing the commutative operation between each of the data elements of the second set; and comparing the first and second signatures to detect a fault attack.

15 Claims, 4 Drawing Sheets

(56) References Cited

OTHER PUBLICATIONS

Bertoni G., et al., *Error Analysis and Detection Procedures for a Hardware Implementation of the Advanced Encrypetion Standard*, IEEE Transactions on computers, IEEE Service Center, Los Alamitos, CA LNKD-DOI:10.1109/TC, 2003.1190590; vol. 52, No. 4, Apr. 1, 2003, pp. 492-505; XP011095866.

Karpovsky M. et al., *Robust Protection Against Fault-Injection Attacks on Smart Cards Implementing the Advanced Encryption Standard*, Dependable Systems and Network, 2004 international Conference on florence, Italy, Jun. 28-Jul. 1, 2004, Piscataway, NJ, IEEE LNKD-DOI:10 11/09/DSN, 2004.1311880, Jun. 28, 2004, pp. 82-90, XP010710793.

Hagai Barr-El, et al., *The Sorcer's Apprentice Guide to Fault Attacks*, Internet Citation, Oct. 16, 2004, XP002329915.

Karri, R et al., *Concurrent Error Detection Schemes Our Fault-Based Side-Channel Cryptanalysis of Symmetric Block Ciphers*, IEEE Transactions on computer-Aided Design of Integrated Circuits and Systems, Dec. 16, 2002, pp. 1509-1517, XP0025587894.

\* cited by examiner

| A'=A+2 | 14 | 3 | 2 | 130 | 247 | 2 | 3 | 0 | 10 |
| --- | --- | --- | --- | --- | --- | --- | --- | --- | --- |
| A'+1=A+3 | 15 | 2 | 3 | 131 | 246 | 3 | 2 | 1 | 11 |
| A'+2=A | 12 | 1 | 0 | 128 | 245 | 0 | 1 | 2 | 8 |
| (A'+1)+2=A+1 | 13 | 0 | 1 | 129 | 244 | 1 | 0 | 3 | 9 |

METHOD AND APPARATUS FOR DETECTION OF A FAULT ATTACK

CROSS REFERENCE TO RELATED APPLICATIONS

This application claims the priority benefit of French patent application Ser. No. 09/58141, filed on Nov. 18, 2009, entitled "Method and Apparatus for Detection of a Fault Attack," which is hereby incorporated by reference to the maximum extent allowable by law.

BACKGROUND OF THE INVENTION

1. Field of the Invention

The present invention relates to a method and apparatus for detecting fault attacks, and in particular to a method and apparatus for providing detection based on signatures.

2. Discussion of the Related Art

Integrated circuits may comprise circuitry that is considered sensitive in view of the security of the data it manipulates, such as authentication keys, signatures, etc., or in view of the algorithms it uses, such as encryption or decryption algorithms. Such information is desired to be kept secret, meaning that it should not be communicated to or otherwise be detectable by third parties or unauthorized circuits.

A common process for pirating information manipulated by an integrated circuit consists in detecting the zones of the circuit that are used during the processing of that information. For this, the circuit is activated or placed in a functional environment and data packets to be encoded are introduced at an input. While the data is being processed, the surface of the integrated circuit is swept by a laser to inject faults in the functioning of the circuit. By analyzing in parallel the outputs of the circuit, this enables the zones of the circuit that process the data to be determined. Having localized these zones, the pirate can concentrate attacks on these zones in order to determine the secret data being processed.

Signatures provide a way of protecting a circuit against fault attacks. A signature is generated based on one or more data values that will be used by an algorithm. A signature is then generated on the same data values after they have been used by the algorithm. A difference in the two signatures will indicate the occurrence of an attack. Once the detection circuit has detected such an attack, it can trigger a counter measure, such as resetting the circuit, and/or incrementing a counter, which renders the integrated circuit permanently inactive once a certain number of faults have been detected.

Side channel attacks are a different type of attack involving, for example, measuring the power consumption of a circuit. Blinding provides a way of protecting a circuit against side channel attacks. Blinding involves altering, in a non-destructive fashion, the inputs of an algorithm using a pseudo-random variable.

It would be desirable to provide circuits in which a same group of data values can be used to generate signatures to detect fault attacks and be blinded to make side channel attacks harder. However, there are difficulties in implementing effective circuits that combine these functions.

SUMMARY OF THE INVENTION

It is an aim of the present invention to at least partially address one or more problems in the prior art.

According to one embodiment of the present invention, there is provided a method of detecting a fault attack comprising: providing a plurality of blinding values; generating a first set of data elements comprising a first group of data elements and at least one additional data element generated by performing the exclusive OR between at least one data element in the first group and at least one of said blinding values; generating a second set of data elements corresponding to the exclusive OR between each data element of the first set and a selected one of said plurality of blinding values; generating a first signature by performing a commutative operation between each of the data elements of the first set; generating a second signature by performing said commutative operation between each of the data elements of the second set; and comparing the first and second signatures to detect a fault attack.

According to one embodiment, generating said at least one additional data element comprises generating a plurality of additional groups of data elements by performing the exclusive OR between each data element of the first group of data elements and each of said plurality of blinding values, and selecting at least one data value of at least one additional group to form the at least one additional data element.

According to another embodiment, generating the at least one additional groups of data elements further comprises performing the exclusive OR between each data element of the first group of data elements and each combination of two of said blinding values.

According to another embodiment, the second set of data elements is generated by blinding each data element of said first set by performing the exclusive OR between each data element of the first set and the selected one of the plurality of blinding values.

According to another embodiment, the second set of data elements is generated by blinding said first group of data values to generate a blinded group of data elements by performing the exclusive OR between each data element of the first group and the selected one of the plurality of blinding values, and performing the exclusive OR between at least one data element and said at least one of said blinding values.

According to another embodiment, selecting the at least one additional data element comprises, for each data value in each blinded group: determining whether said data value is already present in the second set; and if said data value is not already present in the second set, adding said data value to the second set.

According to another embodiment, selecting the at least one additional data element further comprises: tagging each data value added to the second set as unavailable; and if said data value is already present in the second set, determining whether said data value is tagged as unavailable, and if not, tagging said data value as unavailable, and if so, adding said data value to the second set.

According to another embodiment, generating said first and second signatures comprises performing an exclusive OR between each data element of the corresponding set of data elements.

According to another embodiment, generating said first and second signatures comprises adding together each data element of the corresponding set of data elements.

According to another embodiment, generating said first and second signatures comprises multiplying together each data element of the corresponding set of data elements.

According to another embodiment of the present invention, there is provided circuitry for detecting a fault attack comprising: a memory storing a plurality of blinding values; a computation block arranged to: generate a first set of data elements comprising a first group of data elements and at least one additional data element generated by performing the exclusive OR between at least one data element in the first group and at least one of said blinding values; generate a second set of data elements corresponding to the exclusive OR between each data element of the first set and a selected one of said plurality of blinding values; a signature block arranged to generate a first signature by performing a commutative operation between each of the data elements of the first set, and a second signature by performing said commutative operation between each of the data elements of the second set; and a comparator arranged to compare the first and second signatures to detect a fault attack.

According to another embodiment, the circuitry further comprises a function unit arranged to perform an operation based on at least one data value of the first set, wherein said function block is arranged to perform an encryption or decryption operation based on a secret key.

According to another embodiment of the present invention, there is provided an integrated circuit, an integrated circuit (IC) card or an integrated circuit (IC) card reader comprising the above circuitry.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

For clarity, only those steps and elements useful in an understanding of the invention have been represented in the figures and will be described in detail. In particular, the circuitry for resetting an integrated circuit or rendering it inactive upon detection of one or more fault injections has not been detailed, the invention being applicable to any such circuits. Furthermore, the primary functions of the integrated circuit being protected have not been described in detail, the invention being compatible with integrated circuits implementing any sensitive functions, such as encryption or decryption, or other functions involving sensitive data.

Figure 1:
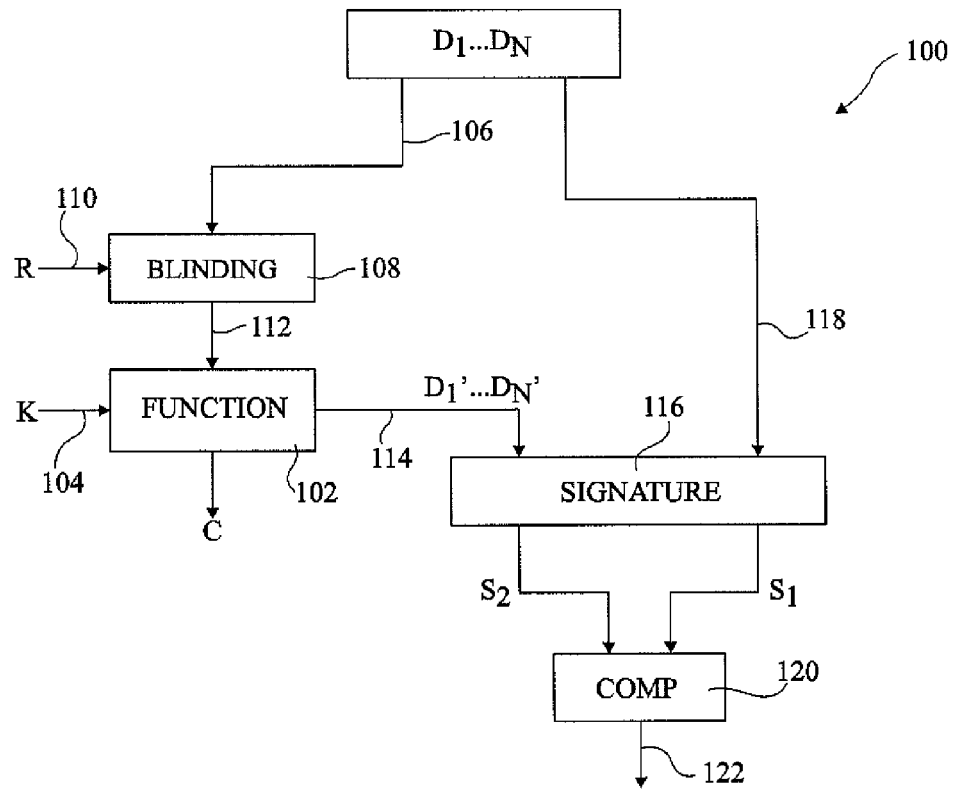
FIG. 1 illustrates a circuit for detecting fault attacks and protecting against side channel attacks according to one embodiment.

FIG. 1 illustrates a circuit 100 comprising a function unit (FUNCTION) 102, which for example implements an algorithm involving sensitive data, such as an encryption key or the like. In the present example, unit 102 receives a key K on an input line 104.

A group of data values $D_1$ to $D_N$ are provided on a line 106 to a blinding block (BLINDING) 108, which applies a blinding algorithm on these data values based on a blinding value R provided on an input line 110 to the blinding block 108. The blinding value R is for example a pseudo-random value. The blinded data values $D_1'$ to $D_N'$ are then provided on a line 112 to the function unit 102. Function unit 102 implements an algorithm that uses the blinded data values $D_1'$ to $D_N'$, and outputs a result C, which could be an encrypted or decrypted data block, or other value.

While being used by function unit 102, the blinded data values $D_1'$ to $D_N'$ are, for example, stored in a register (not shown in FIG. 1). At various stages during execution of the algorithm by the function block 102, and/or at the end of this execution, the blinded values $D_1'$ to $D_N'$ are output on a line 114 to a signature block (SIG) 116. The original data values $D_1$ to $D_N$ are also provided to the signature block 116 on a line 118.

Signature block 116 generates a signature $S_1$ based on the original data values $D_1$ to $D_N$, and a signature $S_2$ based on the blinded data values $D_1'$ to $D_N'$. The signatures $S_1$ and $S_2$ are then compared by a comparator (COMP) 120, which provide an output on an output line 122 indicating whether or not the signatures match.

The blinding algorithm applied by block 108 is, for example, the XOR function, applied between the blinding value R and each of the data values $D_1$ to $D_N$. However, there is a problem in choosing a signature function to be applied to the both groups of data values to achieve the same result when no fault attack is present. For example, FIG. 2 illustrates an example of this problem.

Figure 2:
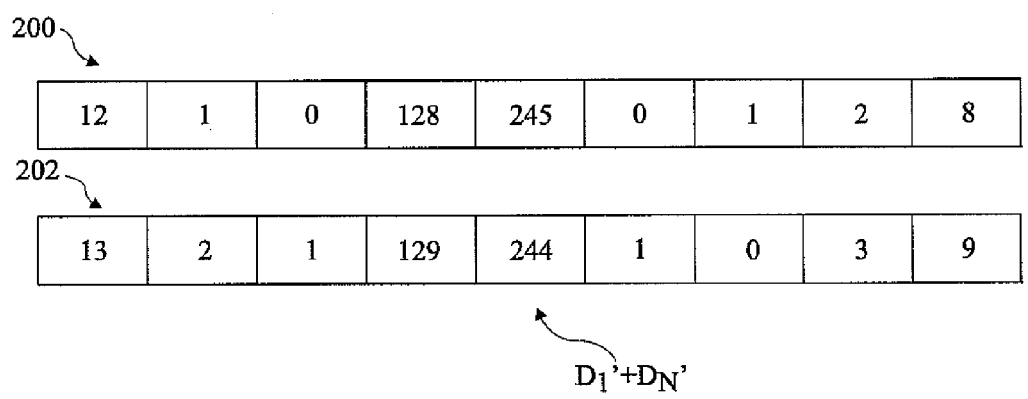
FIG. 2 illustrates data values used by the circuitry of FIG. 1.

FIG. 2 illustrates, in a first row 200, an example of the data values $D_1$ to $D_N$ for the case that N is equal to 9, and the values $D_1$ to $D_9$ are equal to 12, 1, 0, 128, 245, 0, 1, 2 and 8 respectively. Assuming that the function for determining the signature is an addition of all the data values, the signature of $D_1$ to $D_9$ will equal 397. A second row 202 in FIG. 2 illustrates the blinded data values $D_1'$ to $D_9'$, which in this example are obtained by applying an XOR operation between each of the data values $D_1$ to $D_9$ and the value 01. Thus the values $D_1'$ to $D_9'$ are equal to 13, 2, 1, 129, 244, 1, 0, 3 and 9 respectively. However, the sum of the data values $D_1'$ to $D_9'$, and thus the signature $S_2$, is equal to 402, assuming no faults. Thus, the signature scheme is ineffective as a mismatch of the signatures $S_1$ and $S_2$ occurs despite there being no fault.

Figures 3, 4:
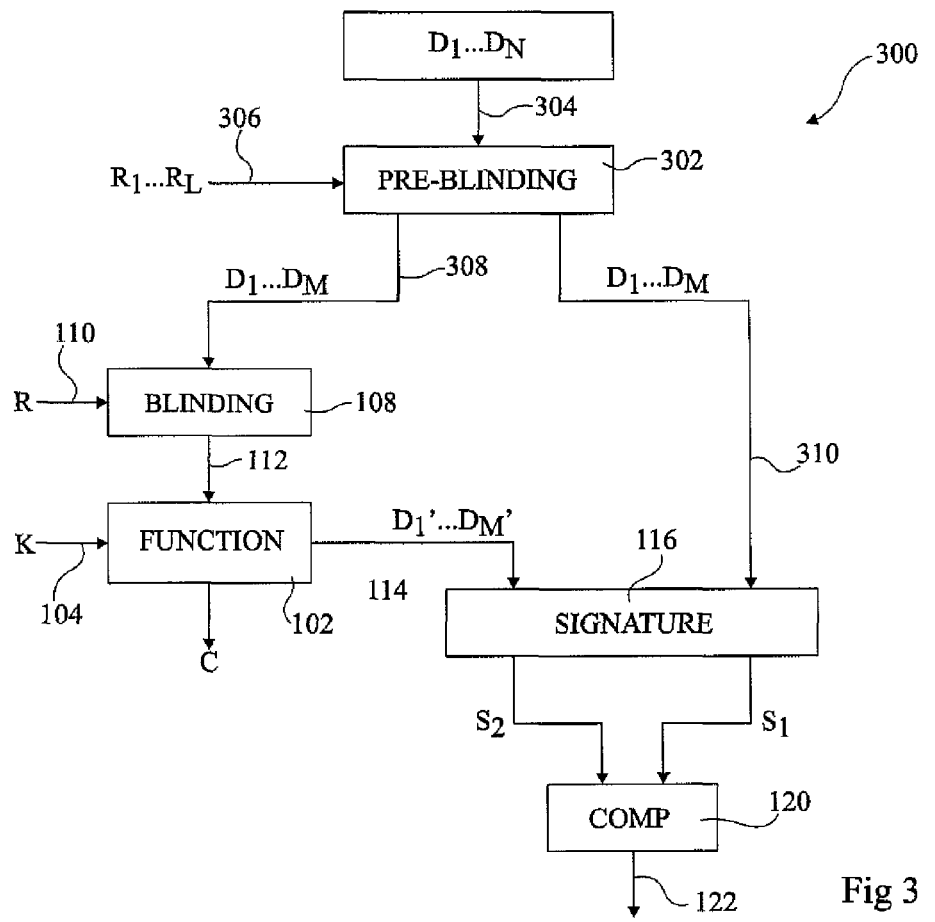
FIG. 3 illustrates circuitry for detecting fault attacks and protecting against side channel attacks according to an embodiment of the present invention.
FIG. 4 illustrates an example of data used by the circuitry of FIG. 3.

FIG. 3 illustrates circuitry 300 for detecting a fault attack and for protecting against side channel attacks. Circuitry 300 comprises many of the same elements as the circuitry of FIG. 1, and these elements will not be described again in detail. In particular, this circuit comprises the function unit 102, blinding block 108, signature block 116, and comparator 120.

The circuitry 300 additionally comprises a pre-blinding block (PRE-BLINDING) 302, which receives on input lines 304 the data values $D_1$ to $D_N$ and on input lines 306 a plurality of blinding values $R_1$ to $R_L$. The pre-blinding block 302 generates a data set of data values $D_1$ to $D_M$. The set $D_1$ to $D_M$ comprises the data values $D_1$ to $D_N$, and one additional data value $D_M$, or a plurality of additional data values $D_{N+1}$ to $D_M$. The data values $D_1$ to $D_M$ are provided to the blinding block 108 on lines 308, and to the signature block 116 on lines 310.

The set $D_1$ to $D_M$ is generated such that when an XOR blinding function is applied by block 108, the result is a permutation of the data values $D_1$ to $D_M$, without introducing new values, and thus the signature block 116 is able to generate a valid signature using any commutative function. This is, for example, achieved as will now be described in more detail with reference to FIG. 4.

FIG. 4 illustrates a table containing an example of the data values of the data set $D_1$ to $D_M$. The top row of the table shows the data values $D_1$ to $D_N$, in this case comprising nine values $D_1$ to $D_9$ equal to the binary equivalent of the decimal values 12, 1, 0, 128, 245, 0, 1, 2 and 8 respectively. These data values will be called group A. In this example, it is assumed that the blinding values $R_1$ to $R_L$ comprise two values $R_1$ and $R_2$, equal to the binary equivalent of the decimal values 01 and 02 respectively.

The pre-blinding block 302 generates a new group of data values "A+1" equal to the XOR of each of the values of the data group A with the first blinding value 01 (the symbol "+" designates herein the function XOR). This is shown in the second row of the table in FIG. 4, and the values are equal to 13, 0, 1, 129, 244, 1, 0, 3 and 9. The pre-blinding block also generates a new group of data values "A+2" equal to the XOR of each of the values of the data group A with the second blinding value 02. This is shown in the third row of the table in FIG. 4, and the values are 14, 3, 2, 130, 247, 2, 3, 0 and 10.

In the example of FIG. 4, an additional group of data values "(A+1)+2" is also generated. This is equivalent to "A+3", and is equal to the XOR of each of the values of the data group A with the value 03. The values, shown in the fourth row of FIG. 4, are 15, 2, 3, 131, 246, 3, 2, 1 and 11. This group is not always generated, as in some embodiments only a set of data values, corresponding to each of the blinding values $R_1$ to $R_L$, is generated.

For example, rows corresponding to each possible combination of two of the blinded values $R_1$ to $R_L$ are also generated, unless this combination is equivalent to a blinding value of a row already present. In the example of FIG. 4, (A+1)+2=A+3 is not equivalent to any of the rows previously generated. However, if an additional blinding value $R_2$=03 were also used, only the rows A+1, A+2 and A+3 would be generated, as (A+1)+3 is equivalent to A+2, (A+1)+2 is equivalent to A+3, and (A+2)+3 is equivalent to A+1.

The table of FIG. 4 thus represents the values $D_1$ to $D_M$, which are provided on lines 308 and 310 to the blinding block 108 and the signature block 116 respectively. When blinding is applied to this table, the result is merely a permutation of the rows, without adding any new values. In particular, if the blinding value R, for example selected pseudo-randomly from the values $R_1$ and $R_2$, is equal to 01, the first row would become A+1, while second row becomes (A+1)+1, which is equal to A. Similarly, the third row becomes (A+2)+1, which is equal to A+3, and the fourth row becomes equal to (A+3)+1, which is equal to A+2.

The blinded versions of the data values $D_1$ to $D_N$ are used by the function unit 102. In the example of FIG. 4, depending on whether the blinding value is 01 or 02, these blinded values will be those of the second or third row.

Figures 5, 6:
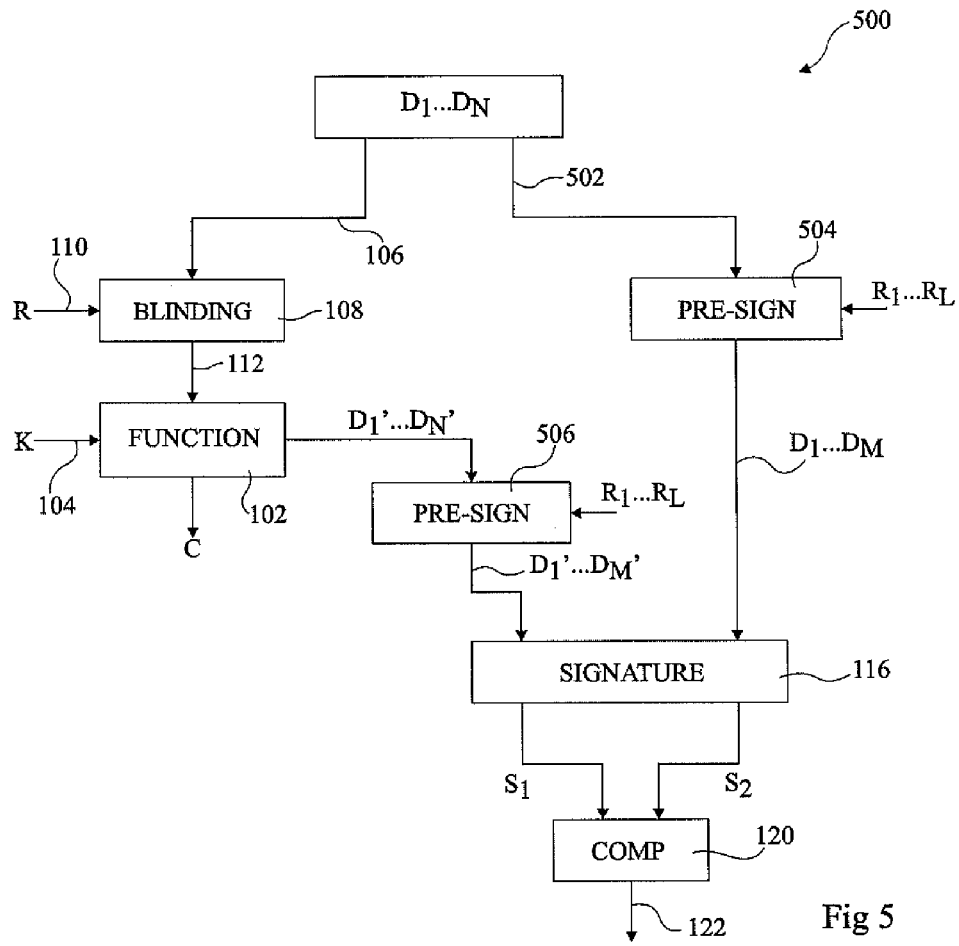
FIG. 5 illustrates circuitry for detecting a fault attack and protecting against side channel attacks according to a further embodiment of the present invention.
FIG. 6 illustrates an example of data used by the circuitry of FIG. 5.

FIG. 5 illustrates circuitry 500 for detecting a fault attack and for protecting against side channel attacks.

Circuitry 500 comprises many of the same elements as the circuitry of FIG. 1, and these elements will not be described again in detail. With respect to the embodiment of FIG. 1, the embodiment of FIG. 5 additionally comprises a line 502 for providing the data values $D_1$ to $D_N$ to an additional pre-signature block 504, and an additional pre-signature block 506 positioned between the function unit 102 and the signature block 116, for processing the blinded data values prior to signature generation. Operation of the circuitry of FIG. 5 will now be described with reference to FIG. 6.

FIG. 6 illustrates the same numerical example as FIG. 4 when applied to the circuitry of FIG. 5. The pre-signature block 504 generates the same table of values $D_1$ to $D_M$ as generated in FIG. 4 (not illustrated again), which will not be described again in detail. The pre-signature block 506 on the other hand generates a new table based on the blinded values $D_1'$ to $D_N'$. The rows of the table are generated in the same way as the table of FIG. 4, in other words by applying each of the blinding values systematically. It is assumed in the example of FIG. 6 that the blinding value received on line 110 is 02, and thus the values $D_1'$ to $D_N'$ correspond to the XOR of each of the values $D_1$ to $D_N$ with the value 02. Thus, the first row of the table in FIG. 6, which is labelled A', is equal to A+2, which is the same as the third row of the table in FIG. 4. The second row of the table in FIG. 6 is equal to K+1, which is equivalent to A+3, in other words the fourth row of the table of FIG. 4. The third row of the table of FIG. 6 is equal to A'+2, which is equivalent to A, in other words the first row of the table of FIG. 4. Finally, the fourth row of the table of FIG. 6 is equal to (A'+1)+2, which is equivalent to A+1, in other words the second row of the table in FIG. 4.

Thus, it has been shown that the values of the table of FIG. 6 are a permutation of the values of table of FIG. 4, and thus the signature block 116 can validly detect faults by applying a commutative signature algorithm to both sets of data values.

An advantage of the embodiment of FIG. 5 when compared to the embodiment of FIG. 3 is that it makes the use of multi-fault attacks harder. In particular, whereas a multi-fault attack targeting FIG. 3 could attack the pre-blinding block 302 and function block 102, in FIG. 4 such an attack would have to target both the pre-signature blocks 504 and 506 in addition to the function block 102.

The signature applied by block 116 of FIG. 3 or 5 is a commutative function such that the order of the data values does not affect the result. Examples of such functions are the XOR function applied between each of the values $D_1'$ to $D_M'$, or the sum of all the values $D_1'$ to $D_M'$, or the multiplication of all the values $D_1'$ to $D_M'$. Alternatively a combination or variation of one or more of these functions could be used.

The number of additional values $D_{N+1}$ to $D_M$ present in the set $D_1$ to $D_M$ can be reduced by removing values which are repeated. For example, in the example of FIG. 4, the values "0" and "1" in the second row could be removed entirely without reducing the effectiveness of the signature comparison. An example of technique for determining which data values can be added to the initial values $D_1$ to $D_N$ in the set $D_1$ to $D_M$ will now be described with reference to the flow diagram of FIG. 7.

Figure 7:
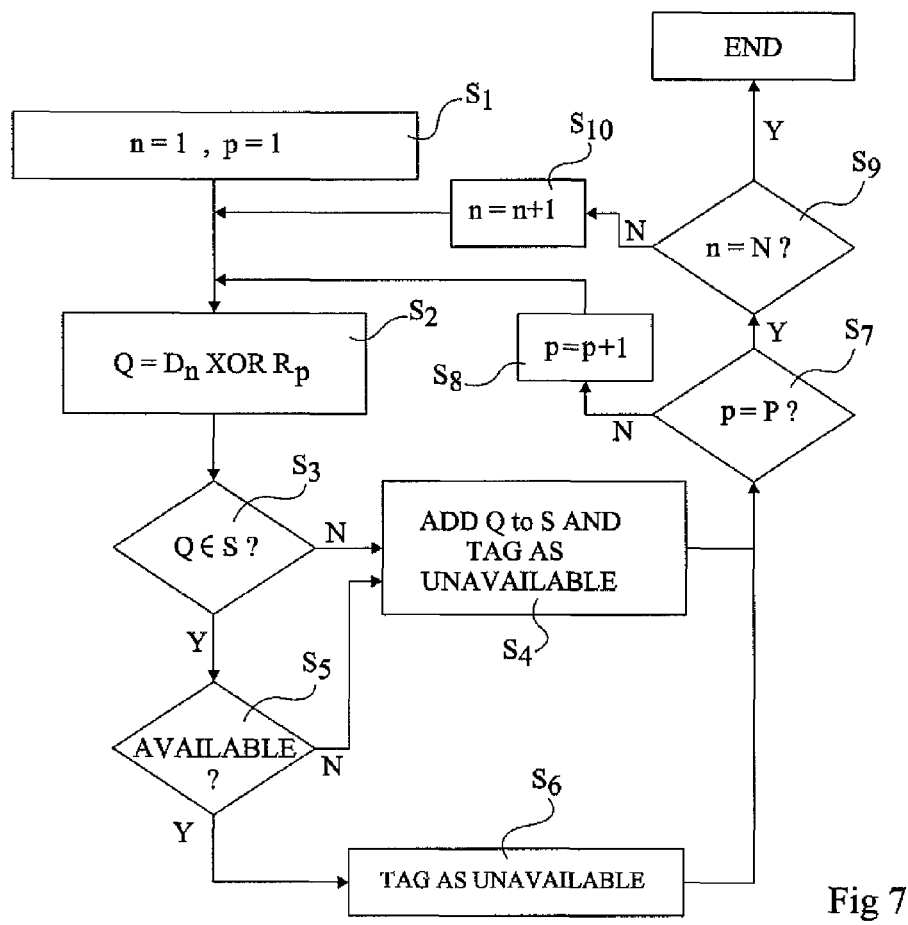
FIG. 7 illustrates steps in a method for generating a data set according to an embodiment of the present invention.

FIG. 7 shows a method for generating the data values $D_{N+1}$ to $D_M$. In this example, $D_n$ designates the $n^{th}$ value in the group $D_1$ to $D_N$, while $R_p$ designates the $p^{th}$ value of the set of values $R_1$ to $R_P$, of which a first L values $R_1$ to $R_L$ are the set of blinding values from which R is selected, and the values $R_{L+1}$ to $R_P$ are the additional combinations, equal to the result of the following XOR calculations: $R_1+R_{(L+1)}$, $R_1+R_{(L+2)}$, ... $R_1+R_P$, $R_2+R_{(L+1)}$, $R_2+R_{(L+2)}$, ... $R_2+R_P$, ... $R_{(L-1)}+R_L$. Any repeated values in the set $R_1$ to $R_P$ can be removed so that each value appears only once, thereby allowing processing time to be reduced. The letter S is used to designate the set of values $D_1$ to $D_M$, which initially comprises just the values $D_1$ to $D_N$.

In a first step S1 of the method, the variables n and p are both set equal to one.

Next, in a step S2, a variable Q is set equal to $D_n$ XOR $R_p$. Initially this will be equal to the XOR of $D_1$ and the first blinding value $R_1$.

In a next step S3, it is determined whether Q is an element of set S, in other words whether this value is present among the values of $D_1$ to $D_N$. If not, the next step is S4, in which Q is added to the set S, and a tag is associated with value Q indicating that this value is unavailable. The tag could be, for example, a flag associated with this value in a memory, or any other means of indicating that this value is unavailable.

If in step S3 it is determined that Q is an element of S, it is checked in a step S5 whether this data value in S is available. In other words, it is checked whether this value has already been tagged as unavailable. If it is not available, the next step is the step S4, as described above, in which Q is added to the set S, and tagged as unavailable. If, however, in step S5 it is determined that the data value in S has not been tagged as unavailable, the next step is S6, in which the data value Q is not added to set S, but instead this value in S is tagged as unavailable.

After steps S4 and S6, the next step is S7, in which it is determined whether p is equal to P. If not, p is incremented in step S8, and the method returns to step S2. If however in step S7 it is determined that p is equal to P, the next step is S9.

In step S9 it is determined whether n is equal to N. If not, then n is incremented in step S10, and the method returns to step S2. If, however, n is equal to N, the process finishes.

Figure 8:
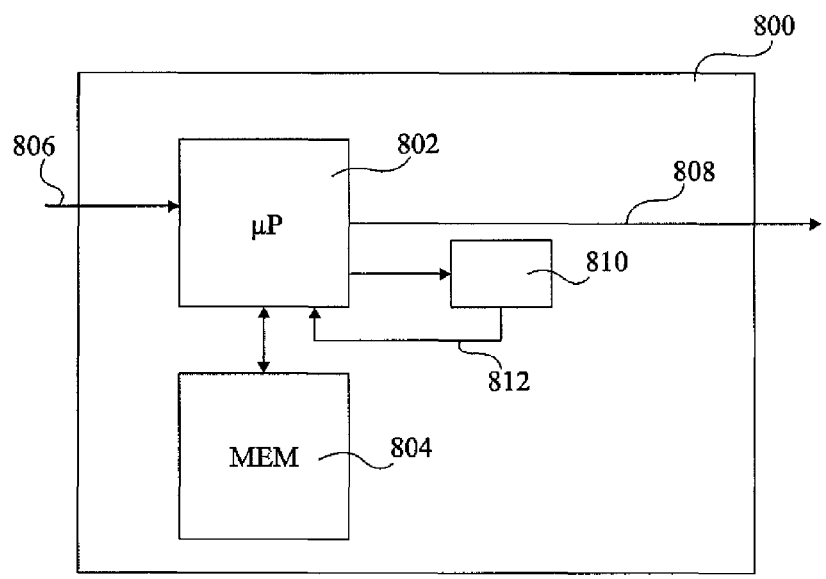
FIG. 8 illustrates an electronic device comprising circuitry for detecting fault attacks according to an embodiment of the present invention.

FIG. 8 illustrates an electronic device 800 comprising a microprocessor 802, a memory block 804, and an input line 806, which provides input values to microprocessor 802. The microprocessor 802 provides output values on an output line 808. Furthermore, fault detection circuitry 810, for example comprising the pre-blinding block 302 or pre-signature blocks 504 and 506, a signature block 116 and a comparator 120 as described herein, is provided coupled to an output of the microprocessor. This circuitry 810 provides an alert signal on an output line 812 provided back to the microprocessor 802 if a fault attack is detected due to a mismatch between the signatures. The alert signal for example triggers a reset of microprocessor 802 and/or increments a counter (not shown in FIG. 8) which will permanently deactivate the microprocessor once a certain count value has been reached.

The electronic device 800 is for example, an integrated circuit (1C) card, such as a smart card, an IC card reader, such as a credit card payment terminal, or a set top box, a hard disk drive for a PC or laptop, a PC or laptop, a vending machine or other device handling sensitive information.

An advantage of the embodiments described herein is that, by generating a set of data values $D_1$ to $D_M$ as described herein for generation of signatures, the result of blinding these values using an XOR operation will result in a permutation of these values. This leads to a broad choice of signature algorithms that can be used to produce comparable signatures for detecting fault attacks.

While a number of particular embodiments of the present invention have been described, it will be apparent to those skilled in the art that numerous variations and alterations may be applied.

For example, it will be apparent to those skilled in the art that the embodiments described herein could be applied to a broad range of circuits in which signature variation is used to detect faults.

Furthermore, it will be apparent to those skilled in the art that while embodiments have been described in which the enlarged set $D_1' \ldots D_M'$ comprises many additional values $D_{N+1}'$ to $D_{M'}$, in some cases only one or just a few additional values are provided.

Furthermore, the embodiments described herein could be implemented in software, hardware or a combination thereof. Additionally, the features described in relation to the various embodiments could be combined in any combination in alternative embodiments.

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

What is claimed is:

1. A method of detecting a fault attack, the method comprising:
   providing a plurality of blinding values;
   generating, using at least one processor, a first set of data elements comprising a first group of data elements and a second group of data elements, the second group of data elements comprising results of performing the exclusive OR between each of the data elements in the first group and at least one of said plurality of blinding values, wherein said second group contains a number of data elements equal to or greater than a number of data elements of said first group;
   generating a second set of data elements corresponding to the exclusive OR between each data element of the first set and a selected one of said plurality of blinding values;
   generating a first signature by performing a commutative operation between each of the data elements of the first set;
   generating a second signature by performing said commutative operation between each of the data elements of the second set; and
   comparing the first and second signatures to detect a fault attack.

2. The method of claim 1, wherein generating said second group of data elements comprises performing the exclusive OR between each of the data elements in the first group of data elements and each of said plurality of blinding values.

3. The method of claim 2, wherein generating said second group of data elements further comprises performing the exclusive OR between each of the data elements in the first group of data elements and each combination of two of said blinding values.

4. The method of claim 1, wherein said second set of data elements is generated by blinding each data element of said first set by performing the exclusive OR between each data element of the first set and the selected one of the plurality of blinding values.

5. The method of claim 1, wherein said second set of data elements is generated by blinding said first group of data values to generate a blinded group of data elements by performing the exclusive OR between each data element of the first group and the selected one of the plurality of blinding values, and performing the exclusive OR between at least one data element of said blinded group of data elements and said at least one of said blinding values.

6. The method of claim 1, wherein generating the second set of data elements comprises, for each data value in the second set:
   determining whether said data value is already present in the second set; and
   if said data value is not already present in the second set, adding said data value to the second set.

7. The method of claim 6, wherein generating the second set of data elements further comprises:
   tagging each data value added to the second set as unavailable; and
   if said data value is already present in the second set, determining whether said data value is tagged as unavailable, and if not, tagging said date value as unavailable, and if so, adding said data value to the second set.

8. The method of claim 1, wherein generating said first and second signatures comprises performing an exclusive OR between each data element of the corresponding set of data elements.

9. The method of claim 1, wherein generating said first and second signatures comprises adding together each data element of the corresponding set of data elements.

10. The method of claim 1, wherein generating said first and second signatures comprises multiplying together each data element of the corresponding set of data elements.

11. Circuitry for detecting a fault attack, the circuitry comprising:
- a memory configured to store a plurality of blinding values;
- a computation circuit arranged to:
  - generate a first set of data elements comprising a first group of data elements and a second group of data elements, the second group of data elements comprising results of performing the exclusive OR between each of the data elements in the first group and at least one of said plurality of blinding values, wherein said second group contains a number of data elements equal to or greater than a number of data elements of said first group; and
  - generate a second set of data elements corresponding to the exclusive OR between each data element of the first set and a selected one of said plurality of blinding values;
- a signature circuit arranged to generate a first signature by performing a commutative operation between each of the data elements of the first set, and a second signature by performing said commutative operation between each of the data elements of the second set; and
- a comparator circuit arranged to compare the first and second signatures to detect a fault attack.

12. The circuitry of claim 11, further comprising a function circuit arranged to perform an operation based on at least one data value of the first set, wherein said function circuit is arranged to perform an encryption or decryption operation based on a secret key.

13. An integrated circuit comprising the circuitry of claim 11.

14. An IC (integrated circuit) card comprising the integrated circuit of claim 13.

15. An IC card reader comprising the integrated circuit of claim 13.

* * * * *

UNITED STATES PATENT AND TRADEMARK OFFICE
CERTIFICATE OF CORRECTION

PATENT NO. : 8,688,995 B2
APPLICATION NO. : 12/943478
DATED : April 1, 2014
INVENTOR(S) : Yannick Teglia Page 1 of 1

It is certified that error appears in the above-identified patent and that said Letters Patent is hereby corrected as shown below:

**In the Specification:

At column 6, line 11, please correct the reference to the term "K+1" which should read as: --A'+1--;

At column 6, line 33, please correct the reference to the term "$D_{I'}$ to $D_{M'}$" which should read as: --$D_{1'}$ to $D_{M'}$--; and At column 7, line 36, please correct the reference to the term "1C" which should read as: --IC--.**

Signed and Sealed this
Fifteenth Day of July, 2014

Michelle K. Lee
*Deputy Director of the United States Patent and Trademark Office*